United States Patent [19]

Tokumitsu et al.

[11] Patent Number: 4,707,743
[45] Date of Patent: Nov. 17, 1987

[54] METHOD AND APPARATUS FOR IMAGE CONVERSION WITH MULTIPLE EXPOSURES FOR FILTERING

[75] Inventors: Jun Tokumitsu; Hajime Sakata, both of Tokyo, Japan

[73] Assignee: Canon Kabushiki Kaisha, Tokyo, Japan

[21] Appl. No.: 829,071

[22] Filed: Feb. 13, 1986

[30] Foreign Application Priority Data

Feb. 19, 1985 [JP] Japan .................................. 60-31041
Feb. 19, 1985 [JP] Japan .................................. 60-31042

[51] Int. Cl.$^4$ ............................................. H04N 5/225
[52] U.S. Cl. ................................. 358/213.13; 358/209; 358/225
[58] Field of Search ............... 358/213, 212, 209, 225, 358/228

[56] References Cited

U.S. PATENT DOCUMENTS

| | | | |
|---|---|---|---|
| 4,571,625 | 2/1986 | Boudewijns | 358/213 |
| 4,581,648 | 4/1986 | Ganther | 358/209 |
| 4,595,954 | 6/1986 | Endo et al. | 358/209 |
| 4,614,966 | 9/1986 | Yunoki et al. | 358/212 |

FOREIGN PATENT DOCUMENTS 53-101939  9/1978  Japan .................................. 358/213

OTHER PUBLICATIONS

*SID 82 Digst*, pp. 288–289, 1982, "Image-Shift Resolution Enhancement Technique for CCD Imagers", K. A. Hoagland.

*Primary Examiner*—Gene Z. Rubinson
*Assistant Examiner*—Stephen Brinich
*Attorney, Agent, or Firm*—Fitzpatrick, Cella, Harper & Scinto

[57] ABSTRACT

A single image is exposed a plurality of times on a solid state image sensor. Charges induced in each exposure and distributed accordingly are added upon shifting the charge positions in the image sensor and are extracted as electrical signals. The multiple exposures may be made at locations on the sensor which are shifted slightly from each to other, or charges from one exposure may be shifted before a later exposure.

15 Claims, 20 Drawing Figures

METHOD AND APPARATUS FOR IMAGE CONVERSION WITH MULTIPLE EXPOSURES FOR FILTERING

BACKGROUND OF THE INVENTION

1. Field of the Invention

The present invention relates to a method and apparatus for converting an image into filtered electrical signals.

2. Related Background Art

Various demands are present in the field of image processing. Especially, filtering for removing noise or the like from image signals is important as a basic part of the processing. Filtering is performed, e.g., in the following manner. When an image is divided into pixel (picture element) arrays and the pixels are then read, a read value of a given pixel is calculated as a weighted average of a plurality of adjacent pixels, including the given pixel. In such filtering, an output signal from an image sensor is processed (i.e., repeated multiplications and additions) by software using a computer or special hardware. For this reason, when the number of pixels to be processed is large, the processing time is prolonged, or an expensive operational/processing unit must be used to increase the processing speed.

SUMMARY OF THE INVENTION

It is an object of the present invention to provide a method for easily converting an image into filtered electrical signals within a short period of time, and an apparatus used therefor.

The above object of the present invention is achieved by exposing a single image on a solid state image sensor a plurality of times, and charges distributed in correspondence with the images induced upon each exposure are added with shifted positions in the image sensor, thereby extracting electrical signals. The multiple exposures may be made at positions on the sensor slightly shifted from each other, or charges from one exposure may be shifted before a later exposure.

DETAILED DESCRIPTION OF THE PREFERRED EMBODIMENTS

The present invention will be described in detail with reference to the accompanying drawings.

Figure 1:
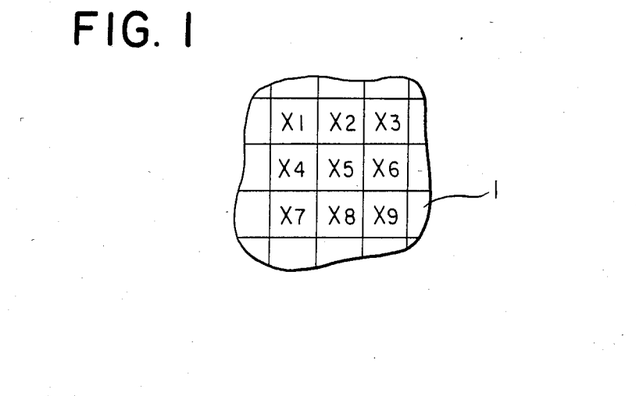
FIG. 1 is a plan view showing a portion of an image.

FIG. 1 is an enlarged view showing a portion of an image. An image 1 is filtered in accordance with the following operation. When an element region for calculating a weighted average of a given pixel is a 3×3 matrix, a filter output Y of, e.g., pixel $X_5$ is given by:

$$Y = \sum_{i=1}^{9} a_i X_i \quad (1)$$

where $X_i$ is the density of the pixel and $a_i$ is the weighting coefficient for that pixel. The same weighting coefficient is used for other pixels, and the overall image is filtered.

Figure 2:
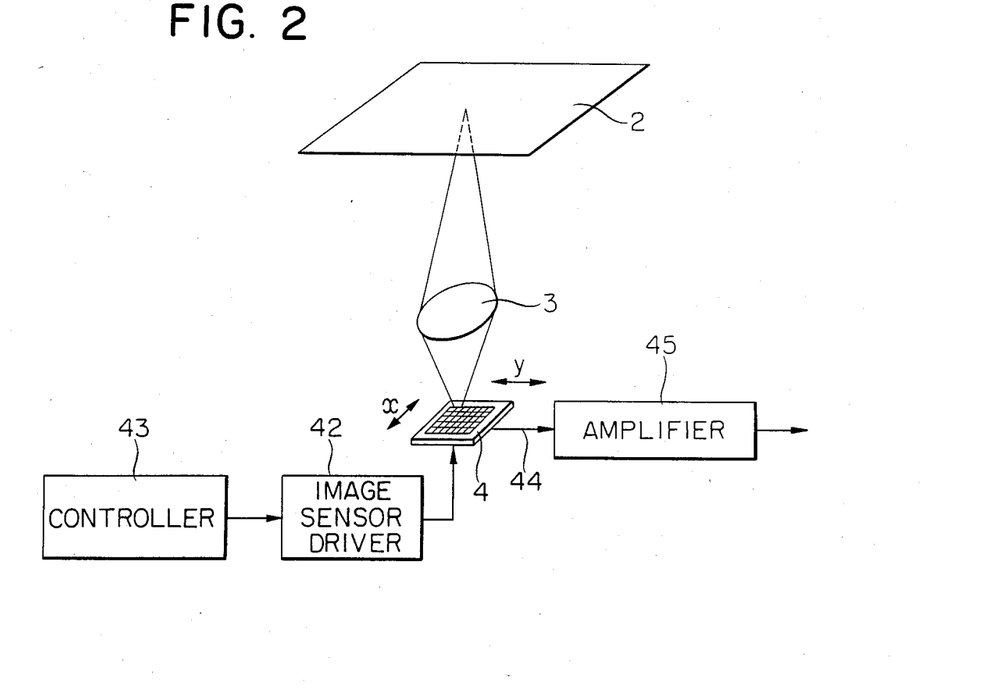
FIG. 2 is a schematic diagram showing a first embodiment of an image processing apparatus for executing the method of the present invention.

FIG. 2 is a schematic view showing a first embodiment of an image processing apparatus for executing the method of the present invention. An input image 2 of an original, a film, print paper or the like is focused by a lens 3 on an image sensor 4 (solid state image sensor) of charge transfer type. The pixels of the image sensor 4 are arranged two-dimensionally (the illustrated x and y directions being the two dimensions). The charges on the image sensor 4 can be transferred in the x and y directions in accordance with clocks from an image sensor driver 42. The image data read by the image sensor 4 is extracted as electrical signals 44, amplified by an amplifier 45, and is supplied to subsequent processing circuits. The charge transfer and information sweep operations of the image sensor driver 42 are controlled by a controller 43.

Figure 3:
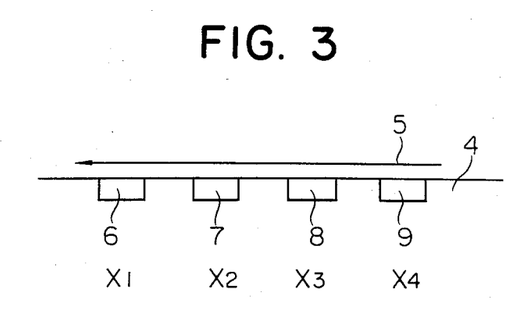
FIG. 3 is a schematic sectional view of an image sensor for explaining the principle of filtering in the apparatus of the first embodiment.

The filtering principle in the apparatus of the first embodiment will be described with reference to FIG. 3. For the sake of easy understanding, an explanation will be made with reference to one dimension. Referring to FIG. 3, an image 5 of an input image is formed on light-receiving sections 6, 7, 8 and 9 of the image sensor 4. The densities of the image 5 on the light-receiving sections 6, 7, 8 and 9 are respectively represented by $X_1$, $X_2$, $X_3$ and $X_4$. If the pixel region for calculating a weighted average is given to be a 3-pixel array, a filtered output $Y_2$ of the image at a position corresponding to $X_2$ is given by:

$$Y_2 = \sum_{i=1}^{3} a_i X_i \quad (2)$$

where ai is the weight to be given each pixel.

Referring to FIG. 3, the charge-transfer image sensor 4 is exposed with an amount of light corresponding to a1. The charges stored in the sections 6, 7, 8 and 9 are respectively given by a1$X_1$, a1$X_2$, a1$X_3$ and a1$X_4$. The charges are shifted by one pixel to the right, and the same image 5 is exposed with an amount of light proportional to a2. Since the charges from this second exposure are stored in addition to those of the first exposure, the charges stored in the sections 7, 8 and 9 are now given by a1$X_1$+a1$X_2$, a1$X_2$+a2$X_3$, and a1$X_3$+a2$X_4$, respectively. The charges are shifted by one pixel again to the right, and the same image 5 is exposed again with an amount of light proportional to a3. Then, the charges stored in the sections 8 and 9 are proportional to a1$X_1$+a2$X_2$+a3X and a1$X_{23}$+a2$X_3$+a3$X_4$, and the charge of the section 8 becomes the filtered output $Y_2$ given by equation (2). Therefore, if this charge is read, a filtered output corresponding to $X_2$ can be obtained. A filtered output corresponding to $X_3$ is given by:

$$Y_3 = \sum_{i=1}^{3} a_i X_{i+1} \quad (3)$$

which is determined from the charge amount stored in the section 9. Upon three exposures and two charge transfers, filtering of the overall image can be performed.

In the above method, exposure with an amount of light proportional to the weighting coefficient ai is performed by controlling the charge transfer timing by the weighting coefficient ai. This will be described with reference to FIGS. 4 and 5.

Figure 4:
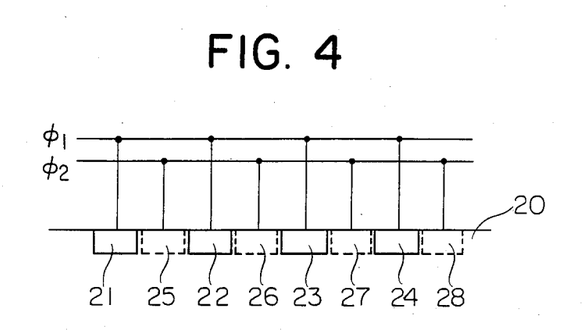
FIG. 4 is a schematic sectional view showing a configuration of an image sensor used in the present invention.

FIG. 4 is a sectional view of a two-phase driven charge-transfer type image sensor (CCD) 20 having light-receiving sections 21, 22, 23 and 24 which also serve as charge transfer sections, and transfer gates 25, 26, 27 and 28. The CCD 20 is driven by two-phase clocks $\phi 1$ and $\phi 2$. Charges stored in the sections 21, 22, 23 and 24 are sequentially shifted to the right through the transfer gates 25, 26, 27 and 28 and light-reception is repeated, upon reception of the clocks $\phi 1$ and $\phi 2$. Exposure with the amount of light proportional to the weighting coefficient ai can be performed by controlling the timings of the clocks $\phi 1$ and $\phi 2$.

Figure 5:
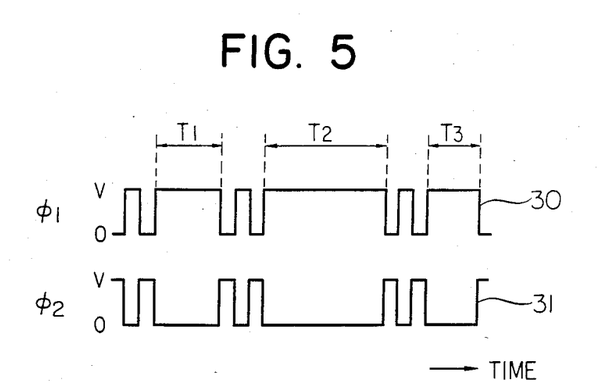
FIG. 5 is a timing chart showing signal waveforms of clocks for driving the image sensor shown in FIG. 4.

FIG. 5 is a timing chart of the clocks $\phi 1$ and $\phi 2$. The clock $\phi 1$ has a waveform 30, and the clock $\phi 2$ has a wave form 31. When the clock $\phi 1$ is V, charge transfer is performed. An image is exposed for the time periods indicated by T1, T2 and T3 in FIG. 3 and charges are stored. When the time periods T1, T2, T3 and so on are set to be proportional to the weighting coefficients a1, a2, a3 and so on, the amounts of charges stored in the sections 21, 22, 23 and 24 are proportional to ai.

The process in the embodiment of the present invention will be summarized. In response to a sweep command from the controller 43, the image sensor driver 42 sweeps all the charges from the image sensor and starts exposure. Then, the image sensor is driven by the clocks modulated in accordance with the weighting coefficients shown in FIG. 5, and exposure is repeated while transferring the charges in units of pixels. The stored charges are extracted as serial electrical signals in response to a command from the controller 43, and are output through the amplifier 45.

Figure 6:
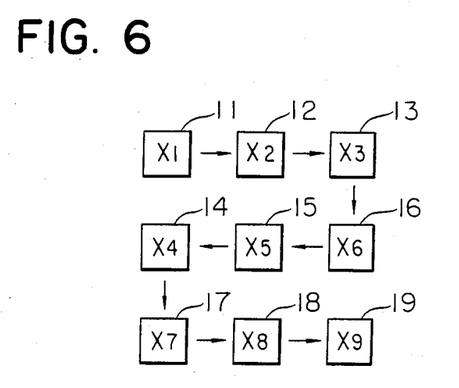
FIG. 6 is a plan view of an image sensor for explaining the principle of two-dimensional filtering.

FIG. 6 is a schematic view for explaining the principle of two-dimensional filtering. The densities of light-receiving sections 11, 12, 13, 14, 15, 16, 17, 18 and 19 of a charge-transfer type image sensor are respectively represented by $X_1$, $X_2$, $X_3$, $X_4$, $X_5$, $X_6$, $X_7$, $X_8$ and $X_9$. The charges are shifted in the direction indicated by the arrow, and the amounts of light exposed to the image sensor are sequentially proportional to the weighting coefficients a1, a2, a3, a4, a5, a6, a7, a8 and a9. Finally, a charge proportional to $$\sum_{i=1}^{9} a_i x_i$$

is stored, and a weighted average within a 3×3 pixel array corresponding to $X_5$ is obtained.

Figure 7A:
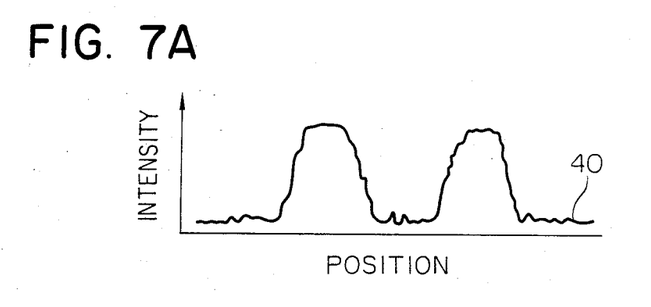
FIGS. 7A and 7B are graphs showing image densities before and after filtering.
Figure 7B:
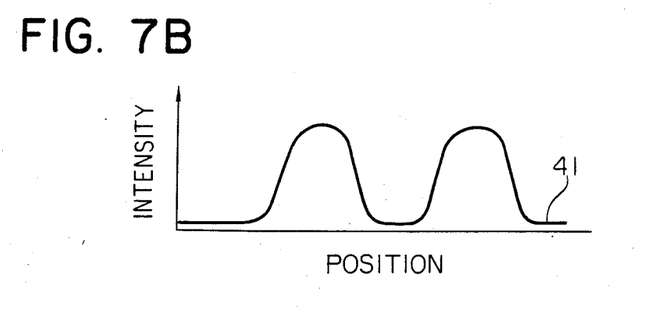

FIGS. 7A and 7B show filtering results by the method of the present invention. FIG. 7A shows an unfiltered image signal, and FIG. 7B shows a filtered image signal. Note that the abscissa denotes position, and the ordinate denotes image intensity. According to the present invention, an original image signal including much noise as indicated by 40 can be filtered into an image signal 41 from which noise is removed. The number of pixels for calculating a weighted average and the weighting coefficient are determined in accordance with the desired filtering degree. However, most simply, the pixel region can be set as a 3×3 pixel array, and all the nine weighting coefficients can be set to be 1, as shown in FIG. 6. In order to obtain better filtering characteristics, the pixel region can be expanded to a 5×5 pixel array. The weighting coefficients can be determined by the Gaussian functions.

The embodiment described above allows various applications. For example, in the above description, the exposure light amount is adjusted by changing the charge transfer timing. However, a shutter can be interposed between the input image and the image sensor, and the opening time of the shutter can be changed in accordance with the weighting coefficients. A variable transmittance filter for changing the brightness of an illumination light source for an input image or for serving as a spatial modulator can be inserted between the input image and the image sensor, and the amount of light incident on the image sensor can be modulated in accordance with the weighting coefficients. In these cases, the charges can be transferred at predetermined time intervals.

In the above description, images are shifted by charge transfer. However, an image formed on the light-receiving surface of an image sensor can be optically shifted. An embodiment illustrating this approach will be described below.

Figure 8:
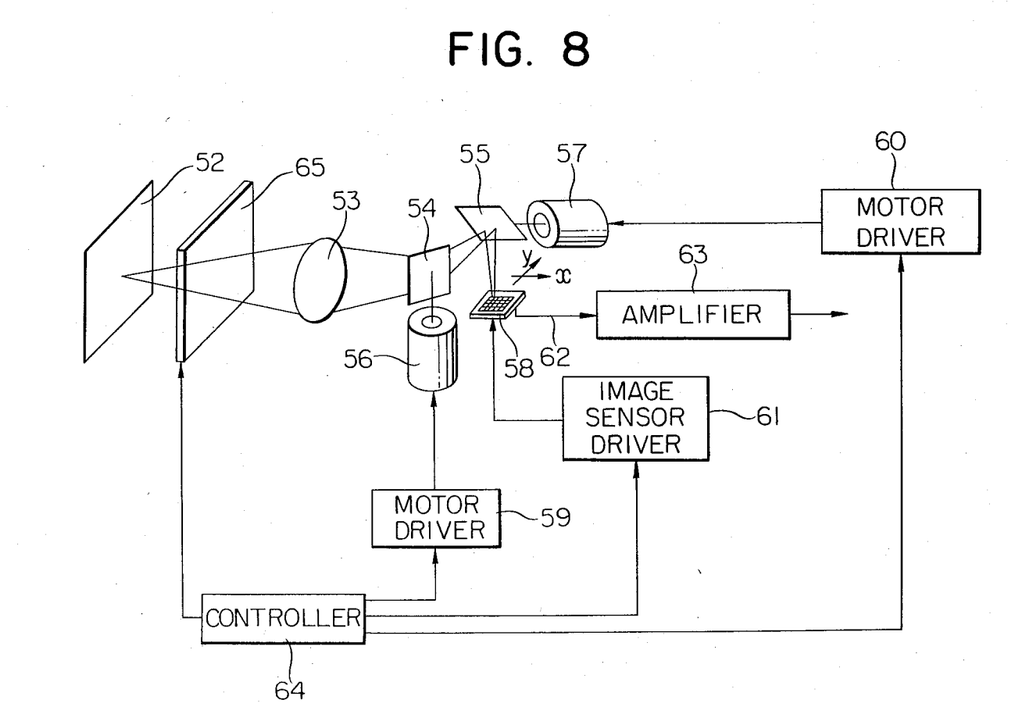
FIG. 8 is a schematic view showing a second embodiment of an apparatus of the present invention.

FIG. 8 is a schematic view showing a second embodiment of an apparatus of the present invention. The apparatus forms an image of an input image 52 such as an original, film or print paper. A first mirror 54 deflects light transmitted through a lens 53. A second mirror 55 deflects perpendicularly light reflected by the first mirror 54. Motors 56 and 57 respectively drive the mirrors 54 and 55 and preferably comprise pulse motors. An image sensor 58 is located at the focal point of the lens 53 and comprises a CCD (Charge Coupled Device) or a BBD (Bucket Brigade Device). A motor driver 60 drives the motors 66 and 57. An image sensor driver 61 drives the image sensor 58. These drivers 60 and 61 are controlled by a controller 64. An electrical signal 62 extracted from the image sensor 58 is amplified by an amplifier 63. A variable transmittance filter 65 such as a spatial optical modulator is used to change transmittance in accordance with a signal from the controller 64.

The input image 52 is formed on the image sensor 58 by the lens 53 through the mirrors 54 and 55. The mirror 54 is rotated by the motor 56, and an image of the input image 52 on the image sensor 58 is shifted in the x direction. Similarly, the mirror 55 is rotated by the motor 57 and an image of the input image 52 is shifted in the y direction.

Figure 9:
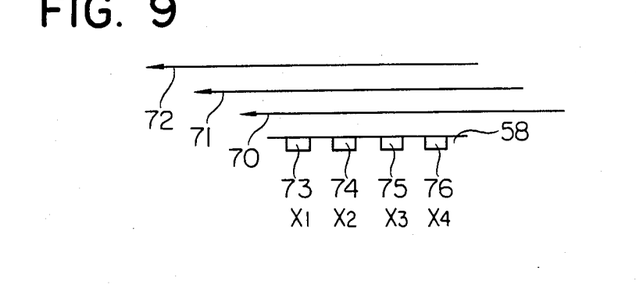
FIG. 9 is a schematic sectional view of an image sensor for explaining the filtering principle in the apparatus of the second embodiment.

The filtering principle according to the method of the present invention will be described with reference to FIG. 9. The following description will be made with reference to one dimension for the sake of easy understanding. Referring to FIG. 9, an image 70 of the input image 52 on the image sensor 58 is formed. An image 71 is obtained by shifting the input image 52 on the image sensor 58 by one pixel in the x direction by rotation of the mirror 54. An image 72 is obtained by shifting the image 52 by two pixels in the x direction in a similar manner. The image sensor 58 has light-receiving sections 73, 74, 75 and 76. The densities of the image 70 on the sections 73, 74, 75 and 76 are respectively represented by $X_1$, $X_2$, $X_3$ and $X_4$. If a pixel region for calculating a weighted average is given as a 3-pixel array, a filtered output $Y_2$ at a position corresponding to $X_2$ is given by equation (2) above.

$$Y_2 = \sum_{i=1}^{3} aiX_i$$

where ai is a weighting coefficient for each pixel.

Referring to FIG. 9, the image 70 is exposed on the image sensor 58 with an amount of light proportional to the weighting coefficient a1 by adjusting the variable transmittance filter 65. The charges stored in the respective sections 73, 74, 75 and 76 are proportional to $a1X_1$, $a1X_2$, $a1X_3$ and $a1X_4$. The mirror 54 is rotated to shift the image 70 by one pixel to the position of the image 71. The transmittance of the variable transmittance filter 65 is changed, and the image 71 is exposed with an amount of light proportional to a2. Since charges are stored in addition to the initial charges, the charges stored in the sections 73, 74 and 75 are respectively proportional to $a1X_1+a2X_2$, $a1X_2+a2X_3$ and $a1X_3+a2X_4$. The mirror 54 is rotated again to shift the image 71 to the position of the image 72 by one pixel. The image 72 is exposed with an amount of light proportional to a3. Then, the charges stored in the sections 73 and 74 become $a1X_1+a2X_2+a3X_3$ and $a1X_2+a2X_3+a3X_4$. Thus, the charge stored in the section 73 is proportional to the filtered output $Y_2$ given by equation (2). When this charge is read, a filtered output corresponding to $X_2$ is obtained. A filtered output $Y_3$ corresponding to $X_3$ is given by equation (3) in the first embodiment:

$$Y_3 = \sum_{i=1}^{3} aiX_{i+1}$$

and is calculated from the charge stored in the section 74. In this manner, the entire image can be filtered by three exposures and two image shiftings.

Figure 10:
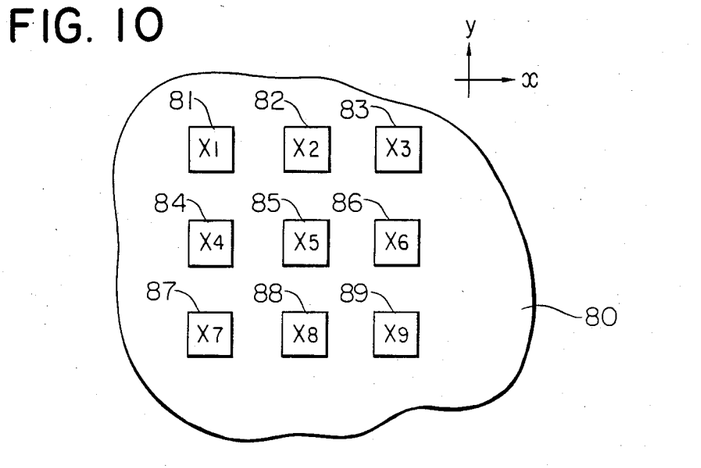
FIG. 10 is a plan view of an image sensor for explaining the principle of two-dimensional filtering in the second embodiment.

Referring to FIG. 8, the mirror 55 is rotated by the motor 57, and the image of the input image 52 is shifted on the image sensor 58 in the y direction. When the operation as described with reference to FIG. 9 is performed, two-dimensional filtering can be performed. The principle of two-dimensional filtering will be described with reference to FIG. 10. FIG. 10 is a schematic plan view of the image sensor. An image 80 is formed on the image sensor 58. The image 58 has light-receiving sections 81, 82, 83, 84, 85, 86, 87, 88 and 89. The densities of the image 80 in the respective sections are represented by $X_1$, $X_2$, $X_3$, $X_4$, $X_5$, $X_6$, $X_7$, $X_8$ and $X_9$. The image 80 is sequentially shifted and sensed by the image sensor 58 to perform two-dimensional filtering.

Figure 11:
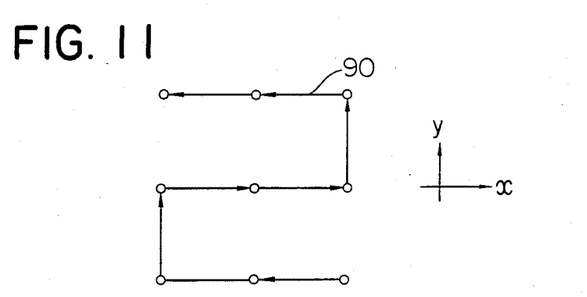
FIG. 11 is a schematic diagram showing the order of image shift in FIG. 10.

FIG. 11 is a schematic view showing the sequence of image shifting in FIG. 10. A moving path 90 is a moving path of the image 80 on the image sensor 58. One arrow between two circles indicates movement of the image by one pixel. When the image 80 is moved on the image sensor 58 along the moving path 90, the respective portions of the image are exposed in the order of $X_1$, $X_2$, $X_3$, $X_4$, $X_5$, $X_6$, $X_7$, $X_8$ and $X_9$. When the variable transmittance filter 65 is controlled to sequentially provide amounts of light of an image 80 on the image sensor 58 proportional to a1, a2, a3, a4, a5, a6, a7, a8 and a9, the charge stored in the section 81 is proportional to $$\sum_{i=1}^{9} aiX_i.$$

This is a weighted average for a 3×3 pixel region corresponding to $X_5$. Since such charge storage is performed in all light-receiving sections of the image sensor 58, filtering of the overall image can be performed using a 3×3 mask by 9 exposure operations and 8 image shiftings.

The above-described two-dimensional filtering is performed by the apparatus shown in FIG. 8. The controller 64 provides required control signals. In response to a signal from the controller 64, the image sensor driver 61 sweeps the charges of the image sensor 58 and starts exposure operation. At this time, the controller 64 controls the variable transmittance filter 65 so as to allow an amount of light proportional to a1 to transmit therethrough. After the image sensor 58 is exposed to the transmitted amount of light, the controller 64 supplies a signal to the motor driver 59 so as to pivot the mirror 54 such that the image of the input image 52 is shifted by one pixel in the x direction on the image sensor. At the same time, the controller 64 changes the transmittance of the variable transmittance filter 65 so as to provide an amount of light proportional to a2 on the image sensor 58. In response to a signal from the controller 64, the mirror 54 shifts the image by one pixel in the y direction and the image sensor 58 is exposed with an amount of light proportional to a3 under similar control.

Subsequently, the controller 64 supplies a signal to the motor driver 60. In response to a drive signal from the motor driver 60, the motor 57 drives the mirror so that the image of the input image 52 is shifted by one pixel in the y direction. After exposing the image with an amount of light proportional to a6, the controller 64 supplies another signal to the motor driver 59. The motor 56 drives the mirror 54 so that the image of the input image 52 is shifted by one pixel in the x direction.

The image sensor is exposed with an amount of light proportional to a5. The image is shifted in the x- and y-directions similarly by rotating the mirrors 54 and 55. Then, image signals obtained by two-dimensional filtering of the input image 52 are stored in the light-receiving sections of the image sensor 58. After all the exposure operations are performed, the controller 64 supplies a read start signal to the driver 61 and image signals 62 are read out from the image sensor 58. The image signals 62 are amplified by the amplifier 63 and supplied to a subsequent processing circuit.

The image shifting means of the second embodiment can be modified in various manners. Another embodiment using an image shifting means different from that used in the second embodiment will be described with reference to FIG. 12. The same reference numerals in FIG. 12 denote the same parts as in FIG. 8, and a detailed description thereof will be omitted.

Figure 12:
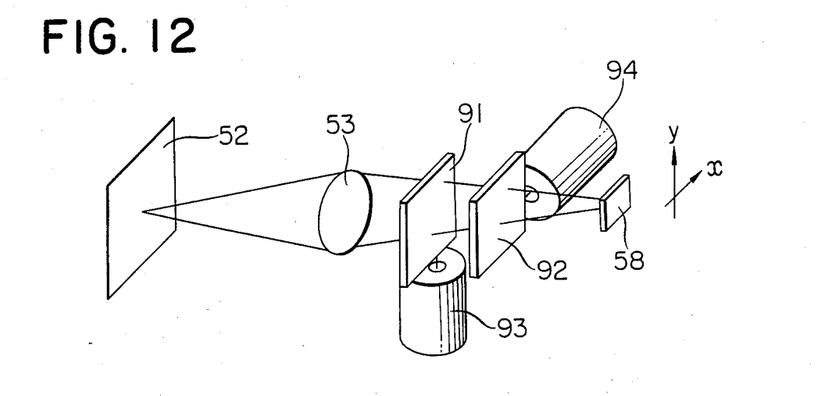
FIG. 12 is a schematic view showing an image shifting means in a third embodiment of the present invention.

FIG. 12 is a perspective view showing a third embodiment of the present invention. Parallel plates 91 and 92 are for shifting an input image 52 in the x-and y-directions, respectively. The plates 91 and 92 are made of transparent glass or plastic. Motors 93 and 94 drive the plates 91 and 92, respectively. The motor driver, the image sensor driver, the variable transmittance filter, the controller and the like in the third embodiment are the same as those used in the second embodiment, and are not illustrated in FIG. 12. In the third embodiment, the image of the input image 52 is shifted by rotating the plates 91 and 92.

Figure 13:
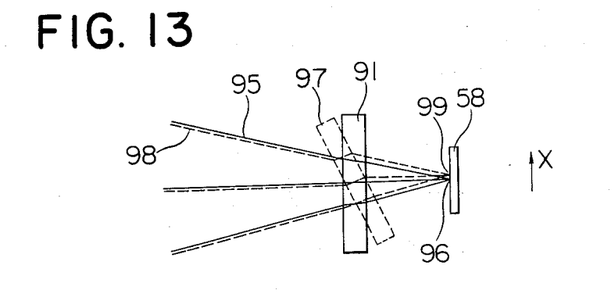
FIG. 13 is a schematic sectional view for explaining the principle of image shifting in the means shown in FIG. 12.

FIG. 13 is a front view for explaining the principle of the image shifting by rotating the parallel plates. Light 95 is emitted from a single point of the input image 52 and is focused at an image point 96 on the image sensor 58. In the state shown in FIG. 13, the plate 91 is pivoted and illustrated by 97. Light 98 corresponds to the pivoted plate 97 and is focused to an image point 99.

In the image sensor 58, light 95 from a single point of the input image 52 is focused on the image point 96 through the plate 91. With the pivoted plate 97, the light 98 propagates along the same optical path as the light 95 until it becomes incident on the plate 97. However, after passing through the plate 97, the light is focused on the image point 99. The image point 99 is shifted from the image point 96 in the x direction. In the above example, the plate 91 is pivoted about an axis perpendicular to the sheet of drawing. However, if the plate 91 is pivoted about an axis parallel to the sheet of drawing, the image point can be shifted in the y direction.

Referring to FIG. 12, the plate 91 is rotated by the motor 93, and the image of the input image 52 is shifted on the image sensor 58 in the x direction. Meanwhile, the plate 92 is rotated by the motor 94, and the image is shifted in the y direction. Filtering in the third embodiment is performed by repeated image shifting of the image sensor with amounts of light proportional to the weighting coefficients $a_i$ and exposures of the image sensor 58 as in the second embodiment.

Figure 14:
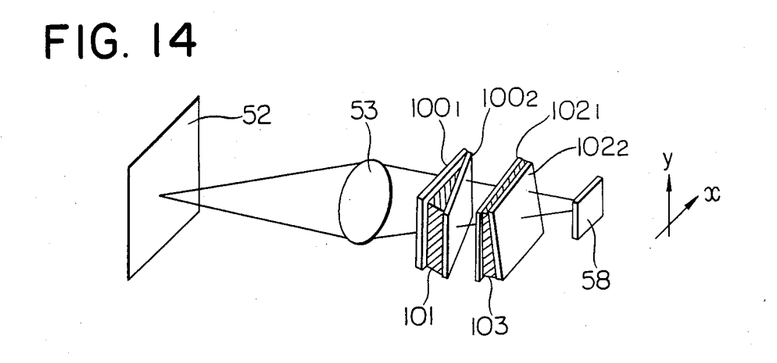
FIG. 14 is a schematic view showing an image shifting means in a fourth embodiment of the present invention.

FIG. 14 is a perspective view showing a fourth embodiment of the present invention. As in FIG. 12, only the image shifting means is illustrated. A transparent elastic body 101 is sandwiched between glass plates $100_1$ and $100_2$. The elastic body 101 can comprise silicone rubber 36 (trade name: "KE104Gel" available from Shnetsu Kagaku K.K.). The plates $100_1$ and $100_2$ can be adhered with a silane coupling agent. The plates $100_1$ and $100_2$ are parallel to the y-axis and form a predetermined angle therebetween to constitute a prism together with the elastic body 101. Glass plates $102_1$ and $102_2$ and a transparent elastic body 103 are similar to the plates $100_1$ and $100_2$ and 102, respectively. The glass plates $102_1$ and $102_2$ are parallel to the x-axis, and constitute a prism together with the elastic body 103.

When the glass plates $100_1$ and $100_2$ or $102_1$ and $102_2$ are moved, the elastic body 101 or 103 changes its shape accordingly, thereby providing a variable vertex angle prism. When a prism is inserted in the optical path of an imaging optical system, the incident light is shifted in accordance with the vertex angle and the image is shifted, as is well known. Therefore, if the vertex angle of the prism changes, the image is continuously shifted.

The vertex angle of the prism constituted by the plates $100_1$ and $100_2$ and the elastic body 101 is changed by moving the glass plate $100_2$ by a drive system (not shown). Thus, the image of the input image 52 is shifted on the image sensor 58 in the x direction. The vertex angle of the prism constituted by the plates $102_1$ and $102_2$ and the elastic body 103 is changed by moving the glass plate $102_2$ by a drive system (not shown). The image of the input image 52 is thus shifted in the y direction.

Filtering in the fourth embodiment is performed by repeated image shiftings and exposures of the image sensor 58 with amounts of light proportional to the weighting coefficients ai as in the third embodiment.

Figure 15A:
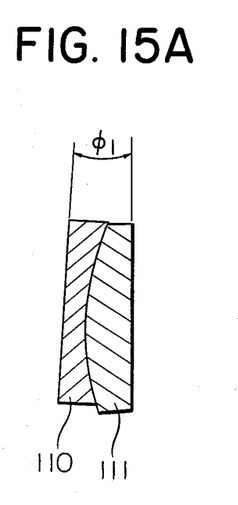
FIGS. 15A and 15B are schematic sectional views showing other configurations of a variable vertex angle prism in the means shown in FIG. 14.
Figure 15B:
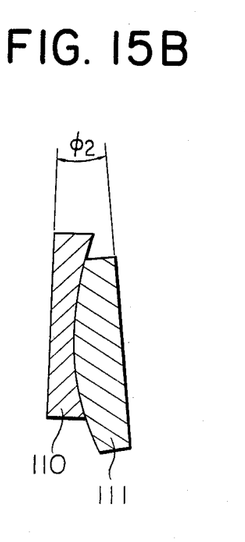

FIG. 15 is a sectional view showing another structure of a variable vertex angle prism. The prism in FIG. 15 consists of a single concave lens 110 and a single convex lens 111. The radius of curvature of the concave surface of the lens 110 has a polarity opposite to but the same absolute value as those of the convex surface of the lens 111. The concave surface of the lens 110 and the convex surface of the lens 111 are opposed to each other. When the lens 111 is slightly shifted, the assembly serves as a prism having a vertex angle $\phi_1$, as shown in FIG. 15A. When the lens 111 is further shifted, the assembly serves as a prism having a vertex angle $\phi_2$, as shown in FIG. 15B. With this arrangement, a variable vertex angle prism can be provided. Therefore, filtering can be performed when this prism is inserted in the imaging optical path of the fourth embodiment in place of the variable vertex angle prism using a transparent elastic body.

Figure 16:
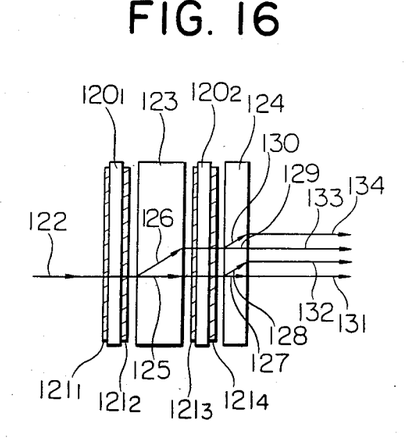
FIG. 16 is a schematic sectional view showing an image shifting means in a fifth embodiment of the present invention.

FIG. 16 is a schematic sectional view showing only an image shifting means of a fifth embodiment according to the present invention. Electrooptical materials $120_1$ and $120_2$ can comprise BSO, $LiNbO_3$, KDP, PLZT and the like. Transparent electrodes $121_1$, $121_2$, $121_3$ and $121_4$ and the materials $120_1$ and $120_2$ together constitute electrooptical cells. The electrodes $121_1$, $121_2$, $121_3$ and $121_4$ preferably comprise ITO or the like. A birefringent material 123 consists of calcite, and another birefringent material 124 has a thickness one-half that of the material 123. When light 122 becomes incident on the image shifting means, normal light 125 and abnormal light 126 propagate through the material 123, normal light 127 and abnormal light 128 corresponding to normal light 125 propagate through the material 124, and normal light 129 and abnormal light 130 corresponding to the abnormal light 126 propagate through the material 124. Output light 121, 122, 123 and 124 correspond to the light 127, 128, 129 and 130, respectively.

The transparent electrodes $121_1$ and $121_2$ are arranged on the two surfaces of the material $120_1$. When a voltage of about 1 kV is applied to the material $120_1$, it serves as a polarization element. Thus, linearly polarized light is provided as incident light 122, and the polarization direction thereof is set to be inclined by 45° with respect to the two principal axes of the material $120_1$. When a voltage applied to the electrodes $121_1$ and $121_2$ is appropriately controlled, the output light from the material $120_1$ becomes the same linearly polarized light as the incident light 122 or becomes linearly polarized light of the polarization direction perpendicular thereto. Output light from the material $120_1$ becomes normal light 125 or abnormal light 126 in the material 123 in accordance with the polarization direction. In the case of the abnormal light 126, when it is refracted as the surface of the material 126, it does not propagate in a direction according to Snell's law but in a direction different from that of the normal light 125. Therefore, the normal light 125 and abnormal light 126 are output from different positions of the material 123.

The transparent electrodes $121_3$ and $121_4$ are formed on the surfaces of the material $120_2$. When a voltage is applied to the material $120_2$, the incident linearly polarized light is converted into linearly polarized light having a polarization direction rotated 90° therefrom. The polarization direction of the normal light 125 is controlled by the material $120_2$, and becomes normal light 127 or abnormal light 128 in the material 124. As in the propagation in the material 123, the normal light 127 and abnormal light 128 propagate in different directions in the material 124 and are output in different directions. Since the thickness of the material 124 is half that of the material 123, the distance between the normal light 127 and the abnormal light 128 is half that in the case of the material 123. Similarly, the polarization direction of the abnormal light 126 is controlled by the material $120_2$ and becomes normal light 129 or abnormal light 130. The distance between the output normal light 129 and the output abnormal light 130 is the same as that between the normal light 127 and the abnormal light 128.

The output light 131, 132, 133 and 134 are separated by the same distance. Which one of the light 131, 132, 133 and 134 is used as the output light is determined in accordance with a combination of the voltages applied to the materials $120_1$ and $120_2$. For example, it is determined in accordance with the following table:

| Voltage to $120_1$ | Voltage to $120_2$ | Output Light |
| --- | --- | --- |
| OFF | OFF | 131 |
| OFF | ON | 132 |
| ON | OFF | 133 |
| ON | ON | 134 |

Since image shifting can be performed by the element shown in FIG. 16, image is shifted in the x direction using the output light 131, 132 and 133 for filtering with a mask of 3×3 pixels. Another set of elements of the same arrangement are arranged with a 90° shift angle. When this arrangement is used as an image shifting means for shifting the image along the y direction, processing as in the second embodiment can be performed.

In the above description, a weighted average is calculated in accordance with the pixel information of an image of an input image 52 corresponding to the position of the light-receiving section of the image sensor 58. However, the present invention is not limited to this, and values of pixels at any desired points can be used.

Figure 17:
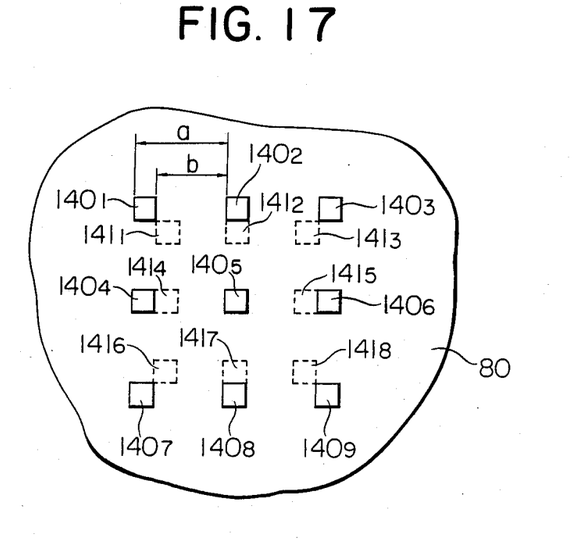
FIGS. 17 and 18 are plan views showing the relationships between pixels and a light-receiving section in an apparatus according to the present invention.

FIG. 17 is a plan view showing an image and positions of pixels for which a weighted average is calculated. An image sensor 58 has light-receiving sections $140_1$ to $140_9$ which are separated by pitch a. Pixels $141_1$ to $141_9$ of an image 80 are separated by pitch b. In the above description, the image 80 is shifted by an integer multiple of a. However, a filtered output can be similarly obtained by shifting an image a number of times b different from a. For example, filtering using a mask of 3×3 pixels having the section $140_5$ as the center can be performed using the image data at the light-receiving section $140_5$ and the image 80 at the pixels $141_1$ to $141_9$. In the conventional electrical filtering, the pixel data which can be used is limited to that corresponding to the light-receiving section of the image sensor 58. However, in the apparatus of the present invention, pixel data at other desired points can be used, and operation flexibility is much improved.

With the apparatus of the present invention having the above arrangement, resolution of image reading can be improved over that determined by the number of pixels of the image sensor used.

Figure 18:
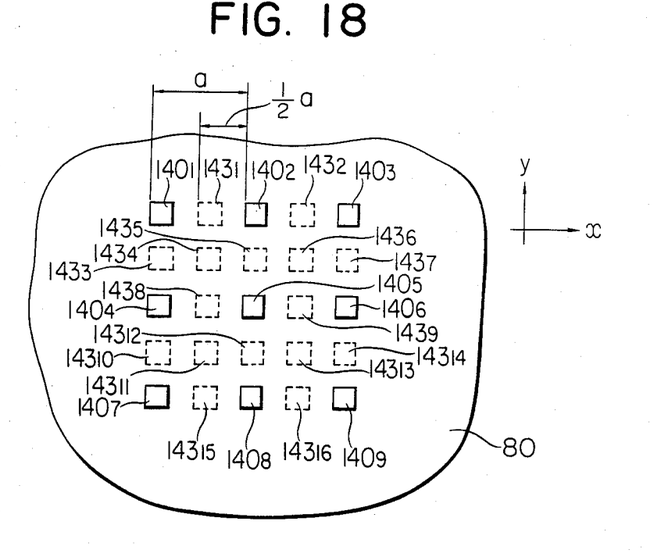

FIG. 18 is a plan view showing the positions of pixels for image reading. Pixel positions $143_1$ to $143_{16}$ are obtained with reference to the light-receiving sections $140_1$ to $140_9$ and by filling the image 80 in the x and y directions at the pitch a/2, half the pitch a of the light-receiving sections.

An image is input at the positions of the light-receiving sections $140_1$ to $140_9$ and stored in a memory. When the image 80 is shifted by a/2 in the x direction and the image is input, the pixels $143_1$, $143_2$, $143_8$, $143_9$, $143_{15}$ and $143_{16}$ are input and are stored in the memory. The image 80 is shifted a/2 in the y direction. Then, pixels $143_4$, $143_6$, $143_{11}$ and $143_{14}$ are input and stored in the memory. Finally, the image 80 is shifted by a/2 in the x direction again, and the pixels $143_3$, $143_5$, $143_7$, $143_{10}$, $143_{12}$ and $143_{14}$ are input and stored in the memory. When the pixel signals stored in this manner are aligned at predetermined positions, the resolution is improved twice in each of the x and y directions and a total of four times as compared with the case wherein an image is input to the image sensor 58 directly.

Various applications of the present invention are possible in addition to the above embodiments. In the above description, as the shifting method, a method for moving the image and the image sensor, and another method for exposing while transferring charges are used. However, a combination of the two methods can be used in the present invention. If the image is shifted in the x direction by charge transfer and in the y direction by image shifting, both the image shifting mechanism and the image sensor can be rendered simple in structure.

As described above, according to the present invention, since operation is performed on the image sensor, a computer or special hardware for processing output electrical signals is not necessary, so that the overall apparatus can be rendered simple and inexpensive. Since all the pixels are aligned for processing, even if the number of pixels is increased, the processing time is not increased and a large amount of pixel data can be processed at high speed.

What we claim is:

1. A method of converting an input image into electrical signals which correspond to an output image subjected to a filtering process, comprising the steps of:
    exposing the input image to a solid state image sensor;
    transferring charges formed in said exposing step and distributed in correspondence with the input image, by a predetermined number of pixels;

re-exposing the same input image as in said exposing step to the solid state image sensor after said transferring step to add the charges generated in said two exposing steps in the solid state image sensor per each pixel with the first-generated charges having been shifted by the predetermined number of pixels, relative to the second-generated charges; and extracting the added charges to obtain electrical signals corresponding to the output image, having the same resolution as the solid state image sensor.

2. A method according to claim 1, wherein said transferring and re-exposing steps are repeated such a number of times as corresponds to a predetermined range of pixels with respect to which a weighted average is to be calculated for the filtering process.

3. A method according to claim 1, wherein each exposure is performed with an amount of light proportional to a weighting coefficient of each pixel when the image is filtered.

4. A method according to claim 3, wherein the amount of light is controlled by transferring the charge at a timing corresponding to the weighting coefficient.

5. A method according to claim 1, wherein said solid state image sensor has light-receiving sections which are two-dimensionally arranged, and the charges are transferred two-dimensionally.

6. An apparatus for converting an input image into electrical signals which correspond to an output image subjected to a filtering process, said apparatus comprising:

a solid state image sensor;

means for repetitively exposing the same input image to said solid state image sensor;

means for changing the relative positional relation between said solid state image sensor and the input image for each exposure;

means for adjusting an exposure light amount for each exposure; and means for extracting charges stored in said solid state image sensor after completion of all of the exposures to obtain electrical signals corresponding to the output image which has the same resolution as said solid state image sensor, said extracting means performing no extraction during the repetitive exposures, and the charges generated in the repetitive exposures being added in the solid state image sensor for each pixel with the charges being relatively shifted.

7. An apparatus according to claim 6, wherein said exposing means includes an optical system for image-forming the input image on said solid state image sensor.

8. An apparatus according to claim 7, wherein said changing means includes a light deflector provided in a light path of said optical system.

9. An apparatus according to claim 7, wherein said adjusting means includes a variable transmittance filter provided in a light path of said optical system.

10. An apparatus according to claim 6, wherein said solid state image sensor is a charge coupled device.

11. An apparatus according to claim 8, wherein said optical polarizer comprises a mirror and a motor which rotates said mirror about an axis parallel to a reflecting surface thereof.

12. An apparatus according to claim 8, wherein said optical polarizer comprises transparent parallel plates, and a motor which rotates said plates about an axis parallel to surfaces thereof.

13. An apparatus according to claim 8, wherein said optical polarizer comprises a variable vertex angle prism constiting of two transparent plates which are arranged in a wedge-like arrangement, and a transparent elastic body filled between said transparent plates.

14. An apparatus according to claim 8, wherein said optical polarizer comprises a variable vertex angle prism consisting of a single convex lens with a convex surface and a single concave lens with a concave surface, said convex surface and said concave surface being slidable with each other.

15. An apparatus according to claim 8, wherein said optical polarizer comprises parallel plates of a birefringent material, and electrooptical cells for changing polarization direction of light incident on said parallel plates.

* * * * *

UNITED STATES PATENT AND TRADEMARK OFFICE
CERTIFICATE OF CORRECTION

PATENT NO. : 4,707,743

DATED : November 17, 1987

INVENTOR(S) : JUN TOKUMITSU, ET AL.    Page 1 of 3

It is certified that error appears in the above-identified patent and that said Letters Patent is hereby corrected as shown below:

IN [56] REFERENCES CITED

OTHER PUBLICATIONS, "SID 82 Digst," should read --SID 82 Digest,--.

IN [57] ABSTRACT

Line 7, "each to other," should read --each other--.

COLUMN 2

Line 36, "the pixel" should read --the ith pixel--.

COLUMN 3

Line 19, "$_1+a2X_2+a3X$ and $a1X_{23}+a2X_3+a3X_4,$" should read --$_1+a2X_2+a3X_3$ and $a1X_2+a2X_3+a3X_4,$--.

Line 52, "wave form 31." should read --waveform 31.--.

COLUMN 4

Line 9, "arrow," should read --arrows,--.

Line 15, "$\sum_{i=1}^{9} aix_i$" should read --$\sum_{i=1}^{9} aiX_i$--.

Line 68, "motors 66 and 57." should read --motors 56 and 57.--.

UNITED STATES PATENT AND TRADEMARK OFFICE
CERTIFICATE OF CORRECTION

PATENT NO. : 4,707,743

DATED : November 17, 1987

INVENTOR(S) : JUN TOKUMITSU, ET AL.

It is certified that error appears in the above-identified patent and that said Letters Patent is hereby corrected as shown below:

COLUMN 5

Line 39, "alby" should read --al by--.
    Line 47, "additionto" should read --addition to--.

COLUMN 7

Line 21, "x-and y-" should read --x- and y- --.
    Line 65, "Shnetsu" should read --Shinetsu--.

COLUMN 8

Line 3, "102," should read --101,--.

COLUMN 9

Line 12, "material 126," should read --material 124,--.

COLUMN 10

Line 30, "shifted a/2" should read --shifted by a/2--.

COLUMN 11

Line 22, "charge" should read --charges--.

UNITED STATES PATENT AND TRADEMARK OFFICE
CERTIFICATE OF CORRECTION

PATENT NO. : 4,707,743

DATED : November 17, 1987

INVENTOR(S) : JUN TOKUMITSU, ET AL.    Page 3 of 3

It is certified that error appears in the above-identified patent and that said Letters Patent is hereby corrected as shown below:

COLUMN 12

Lines 20, 24, 28, 33 and 39, "optical polarizer" should read --light deflector--.
Line 41, "polarization" should read --a polarization--.

Signed and Sealed this

Eighth Day of May, 1990

Attest:

HARRY F. MANBECK, JR.

*Attesting Officer*  *Commissioner of Patents and Trademarks*